United States Patent
Yamato

(10) Patent No.: US 11,548,635 B2
(45) Date of Patent: Jan. 10, 2023

(54) UNMANNED FLIGHT EQUIPMENT AND DELIVERY METHOD

(71) Applicant: Rakuten Group, Inc., Tokyo (JP)

(72) Inventor: Takumi Yamato, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 371 days.

(21) Appl. No.: 16/753,066

(22) PCT Filed: Mar. 28, 2019

(86) PCT No.: PCT/JP2019/013774
§ 371 (c)(1),
(2) Date: Apr. 2, 2020

(87) PCT Pub. No.: WO2020/194707
PCT Pub. Date: Oct. 1, 2020

(65) Prior Publication Data
US 2021/0221508 A1    Jul. 22, 2021

(51) Int. Cl.
*B64D 1/12* (2006.01)
*B64C 39/02* (2006.01)

(52) U.S. Cl.
CPC .............. *B64D 1/12* (2013.01); *B64C 39/024* (2013.01); *B64C 2201/128* (2013.01)

(58) Field of Classification Search
CPC .................................... B64D 1/22; B64D 1/12
See application file for complete search history.

(56) References Cited

U.S. PATENT DOCUMENTS

| | | | |
|---|---|---|---|
| 9,174,733 B1 | 11/2015 | Burgess et al. | |
| 9,688,404 B1 | 6/2017 | Buchmueller et al. | |
| 9,783,295 B2 | 10/2017 | Takayama et al. | |
| 9,969,494 B1* | 5/2018 | Buchmueller | B64D 1/12 |
| 10,071,804 B1 | 9/2018 | Buchmueller et al. | |
| 10,301,021 B2* | 5/2019 | Jones | B64C 39/024 |
| 10,793,274 B2* | 10/2020 | Prager | B64D 17/383 |
| 10,839,336 B2* | 11/2020 | Greiner | G06K 7/10722 |
| 11,059,583 B2* | 7/2021 | Jones | B64C 39/024 |
| 11,104,438 B2* | 8/2021 | Prager | B66D 1/485 |
| 2015/0158587 A1 | 6/2015 | Patrick et al. | |

(Continued)

FOREIGN PATENT DOCUMENTS

| | | |
|---|---|---|
| JP | 2017-087898 A | 5/2017 |
| JP | 2018-090095 A | 6/2018 |

(Continued)

OTHER PUBLICATIONS

Communication dated Sep. 16, 2020 from European Patent Office in EP Application No. 19864003.9.

(Continued)

*Primary Examiner* — Joseph W Sanderson
(74) *Attorney, Agent, or Firm* — Sughrue Mion, PLLC

(57) ABSTRACT

The unmanned flight equipment includes an aerial vehicle capable of flying in an unmanned manner; a linear member configured to be suspended from the aerial vehicle and to hold a delivery target at a lower end thereof; a contact detection unit configured to detect contact with the delivery target or contact with the linear member; and a separation unit configured to separate the delivery target or the liner member based on a detection result of the contact detection unit.

13 Claims, 7 Drawing Sheets

(56) References Cited

U.S. PATENT DOCUMENTS

| | | | |
|---|---|---|---|
| 2017/0011333 A1* | 1/2017 | Greiner | B64D 1/02 |
| 2017/0081029 A1 | 3/2017 | Jones et al. | |
| 2018/0072420 A1* | 3/2018 | Prager | B64D 17/383 |
| 2018/0312247 A1 | 11/2018 | Ichihara | |
| 2019/0235494 A1* | 8/2019 | Cantrell | G05D 1/0055 |
| 2019/0248490 A1* | 8/2019 | Jones | B64C 39/024 |
| 2020/0207474 A1* | 7/2020 | Foggia | B64C 39/024 |

FOREIGN PATENT DOCUMENTS

| | | | |
|---|---|---|---|
| JP | 2018-531174 A | | 10/2018 |
| KR | 20170046217 A | * | 5/2017 |
| KR | 20180117565 A | * | 7/2017 |
| KR | 20170084876 A | * | 10/2018 |
| WO | 2017/053392 A1 | | 3/2017 |
| WO | 2017/078118 A1 | | 5/2017 |

OTHER PUBLICATIONS

International Search Report for PCT/JP2019/013774 dated Apr. 23, 2019 [PCT/ISA/210].

* cited by examiner

UNMANNED FLIGHT EQUIPMENT AND DELIVERY METHOD

CROSS REFERENCE TO RELATED APPLICATIONS

This application is a National Stage of International Application No. PCT/JP2019/013774 filed Mar. 28, 2019.

TECHNICAL FIELD

The present invention relates to unmanned flight equipment and a delivery method.

BACKGROUND ART

It has been under consideration to use an aerial vehicle that can fly in an unmanned manner, such as the so-called drone, to deliver a cargo. Such an aerial vehicle is provided with a box or the like for accommodating a cargo, and the cargo is delivered to a receiver while the box is opened in a state where the aerial vehicle is on the ground. In this case, a flat place having at least a certain area that allows the aerial vehicle to land is used as a place for delivering the cargo.

In view of this, as disclosed in Patent Documents 1 and 2 cited below, it has been also under consideration to use an aerial vehicle that retains a linear member, such as a wire or a rope, the linear member being suspended from the aerial vehicle and holding a delivery target (that may include a cargo and a container accommodating the cargo) at its lower end. The aerial vehicle of this type delivers the cargo while staying in midair without having to land on the ground. According to this method, it is possible to deliver a cargo, provided that a relatively small space where the cargo can be placed is available.

In the case where a delivery target is held by a linear member suspended from an aerial vehicle, an external force such as wind may act on the delivery target or the linear member so as to destabilize the flight state of the aerial vehicle. Therefore, the unmanned flight equipment disclosed in Patent Document 1 includes an adjustment means at a fixing device that fixes a string-like member to a body of the aerial vehicle, the adjustment means adjusting the way of fixing the string-like member in accordance with an attitude of the body such that the center of gravity of the body is on the extension of the vertical line of the string-like member having a cargo hung thereon. As a result, the load of the cargo constantly acts on the center of gravity of the aerial vehicle, thereby enabling the unmanned flight equipment of Patent Document 1 to fly stably.

The delivery apparatus disclosed in Patent Document 2 includes an unmanned aircraft, a main wire suspended from a body of the unmanned aircraft, and an auxiliary wire coupled to a portion of the main wire located toward a fixed end with respect to a free end of the main wire, the auxiliary wire extending along the main wire and having an end located outside with respect to the free end of the main wire. This delivery apparatus is configured such that an operator attaches a cargo to the end of the auxiliary wire while the auxiliary wire is loose, so that a situation can be avoided in which the operator destabilizes the attitude of the unmanned aircraft by pulling the main wire when attaching the cargo.
Patent Document 1: Japanese Unexamined Patent Application, Publication No. 2018-90095
Patent Document 2: Japanese Unexamined Patent Application, Publication No. 2017-87898

SUMMARY OF INVENTION

Technical Problem

With the configuration of Patent Document 1, when the string-like member is pulled, for example, it is impossible for the aerial vehicle to maintain its attitude. With the configuration of Patent Document 2, while it is possible to prevent the main wire from being pulled when a cargo is attached, when the cargo is delivered (when the cargo is detached from the auxiliary wire), the main wire is pulled, thereby making it impossible to prevent the attitude of the unmanned aircraft from being destabilized.

One or more embodiments of the present invention has been conceived in view of the forgoing background, and an object of one or more embodiments of the present invention are directed to provide unmanned flight equipment including an aerial vehicle of which an attitude is unlikely to be destabilized by an external force acting on a linear member suspended from the aerial vehicle or on a cargo.

Solution to Problem

Unmanned flight equipment according to an aspect of the present invention includes: an aerial vehicle capable of flying in an unmanned manner; a linear member configured to be suspended from the aerial vehicle and to hold a delivery target at a lower end thereof; a contact detection unit configured to detect contact with the delivery target or contact with the linear member; and a separation unit configured to separate the delivery target or the liner member based on a detection result of the contact detection unit.

A delivery method according to another aspect of one or more embodiments of the present invention is a method for delivering a delivery target by an aerial vehicle capable of flying in an unmanned manner. The delivery method includes: causing a linear member that is to be suspended from the aerial vehicle to hold the delivery target at a lower end of the linear member; detecting contact with the delivery target or contact with the linear member during flight of the aerial vehicle; and separating the delivery target or the linear member based on a detection result obtained in the detecting contact.

Advantageous Effects of Invention

The present invention provides unmanned flight equipment including an aerial vehicle of which an attitude is unlikely to be destabilized by an external force acting on a linear member suspended from the aerial vehicle or on a cargo.

DESCRIPTION OF EMBODIMENTS

Figure 1:
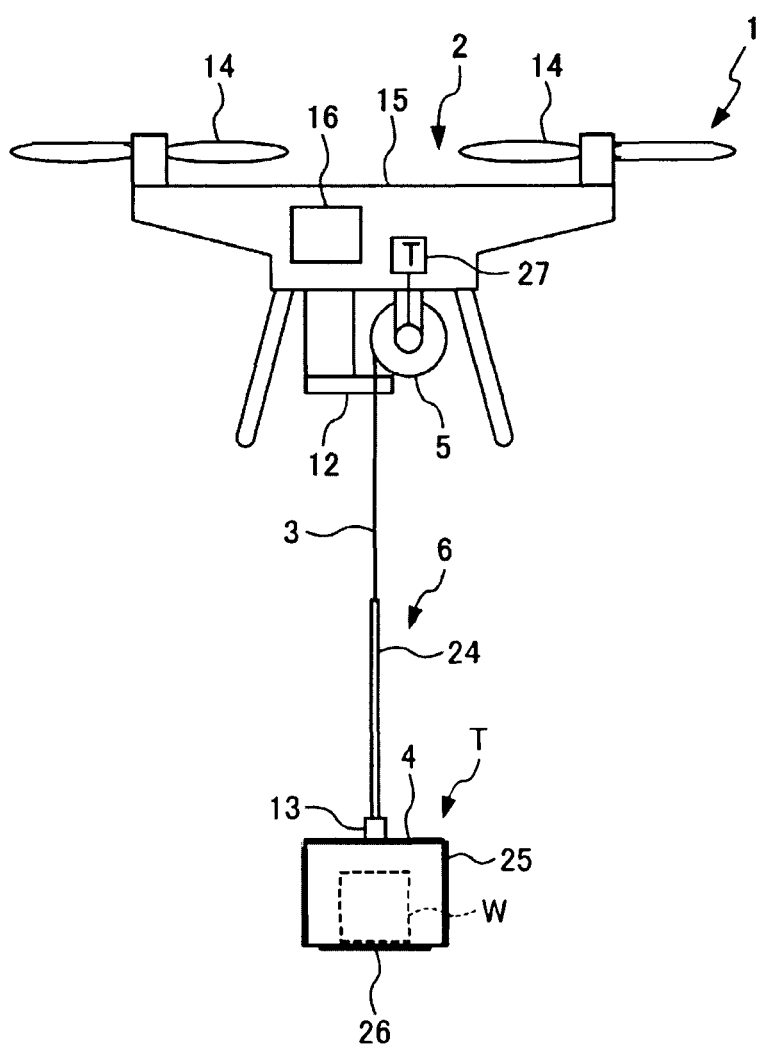
FIG. 1 is schematic side view showing a configuration of unmanned flight equipment according to a first embodiment of the present invention.
Figure 2:
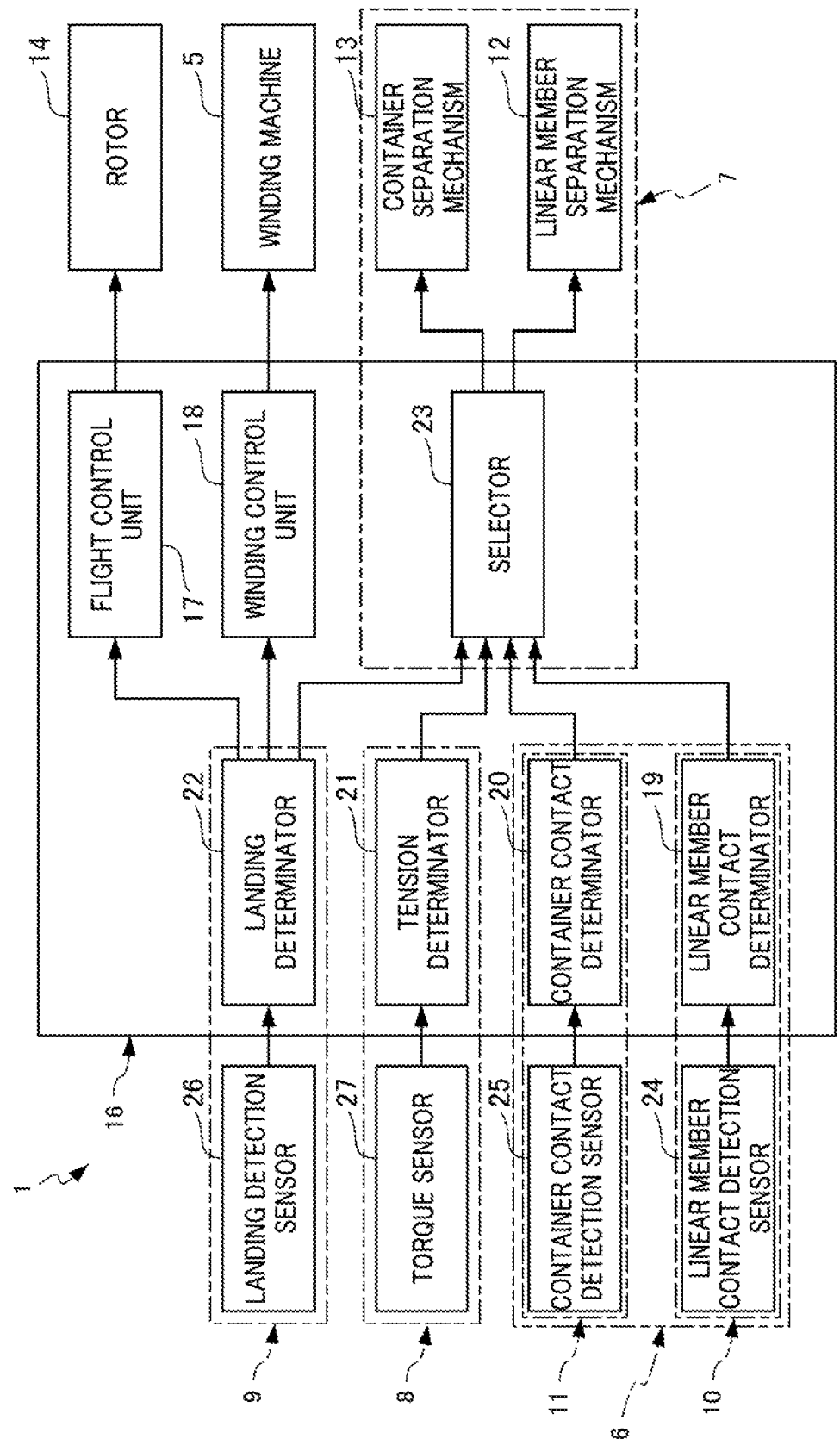
FIG. 2 is a block diagram showing the configuration of the unmanned flight equipment of FIG. 1.

Non-limiting exemplary embodiments of the present invention will be described with reference to the drawings. FIG. 1 is a schematic side view showing a configuration of unmanned flight equipment 1 according to a first embodiment of the present invention. FIG. 2 is a block diagram showing the configuration of the unmanned flight equipment 1 of FIG. 1.

As shown in FIG. 1, the unmanned flight equipment 1 includes: an aerial vehicle 2 capable of flying in an unmanned manner; a linear member 3 configured to be suspended from the aerial vehicle 2; a container 4 held at a lower end of the linear member 3 and configured to accommodate therein a cargo W; and a winding machine 5 capable of winding the linear member 3. It should be noted that "capable of flying in an unmanned manner" refers to an aerial vehicle that can fly without any person on board the aerial vehicle, and encompasses not only an aerial vehicle capable of autonomous flight, but also an aerial vehicle remotely controlled by a person. The cargo W and the container 4 may be collectively referred to as the "delivery target T".

As shown in FIG. 2, the unmanned flight equipment 1 further includes: a contact detection unit 6 configured to detect contact of an object with the linear member 3 or with the container 4; a separation unit 7 configured to separate the linear member 3 or the container 4 from the aerial vehicle 2; a tension detection unit 8 configured to detect a pull on the linear member 3 or on the container 4; and a landing detection unit 9 configured to detect landing of the container 4 (delivery target T). The "object" to be detected by the contact detection unit 6 includes a person and an animal.

The contact detection unit 6 can be configured to have: a linear member contact detection unit 10 that detects contact with at least a lower region of the linear member 3; and a container contact detection unit 11 that detects contact with the container 4. In other words, the contact detection unit 6 may be configured to detect contact with the linear member 3 and contact with the delivery target T while distinguishing the contact with the linear member 3 and the contact with the delivery target T from each other. The separation unit 7 can be configured to have: a linear member separation mechanism 12 that cuts off the linear member 3 at a point near the aerial vehicle 2 such that at least the lower region of the linear member 3 is separated; and a container separation mechanism 13 that cuts off the container 4 from the linear member 3.

The components of the unmanned flight equipment 1 will be described below. First, the aerial vehicle 2 will be described. While the aerial vehicle 2 is not limited to any particular vehicle as long as it can fly in an unmanned manner, the aerial vehicle 2 of the present embodiment shown in the drawings is an unmanned rotorcraft including a plurality of rotors 14. Specifically, the aerial vehicle 2 has the plurality of rotors 14 and a body 15 holding the plurality of rotors 14.

The plurality of rotors 14 are held on the body 15 and rotate to generate lift for the unmanned flight equipment 1 to fly. The rotors 14 can be arranged on an upper surface of the body 15 so that they can rotate without interfering with the body 15. It is preferable that in planar view, the rotors 14 are held equidistantly from the center of the body 15 and are evenly spaced apart from each other such that their axes of rotation are vertical (and their surfaces of revolution are horizontal).

While holding the plurality of rotors 14, the body 15 is configured to house a battery (power source) for driving the rotors 14 and other components, and a control device 16 for controlling the flight and the like of the aerial vehicle 2.

The control device 16 can be composed of a computer having a CPU, a memory, etc., and including appropriate programs loaded therein. The control device 16 can include: a flight control unit 17 for controlling the rotors; a winding control unit 18 for controlling the winding machine 5; a linear member contact determinator 19 constituting a control element of the linear member contact detection unit 10; a container contact determinator 20 constituting a control element of the container contact detection unit 11; a tension determinator 21 constituting a determination-control element of the tension detection unit 8; a landing determinator 22 constituting a determination-control element of the landing detection unit 9; and a selector 23 constituting a control element of the separation unit 7. These constituent elements of the control device 16 are distinguished from each other in terms of their functions, and may be indistinguishable from each other in terms of their physical configurations or program configurations.

The linear member 3 can be constituted by a wire, for example. The lower region of the linear member 3 may be provided with a linear member contact detection sensor 24 that detects contact. The linear member contact detection sensor 24 constitutes a detector of the linear member contact detection unit 10, which will be described later. The linear member 3 may be used as a signal line through which signals are transmitted from the container contact detection unit 11, the linear member contact detection unit 10, the container separation mechanism 13, the tension detection unit 8 and the landing detection unit 9. Thus, the linear member 3 may be an insulated wire (or an insulated cable).

The container 4 can be embodied as a box that can accommodate therein an arbitrary cargo W. The container 4 may include, on a top surface and a side surface thereof, a container contact detection sensor 25 that constitutes a detector of the container contact detection unit 11. The container 4 may further include, on a bottom surface thereof, a landing detection sensor 26 that constitutes a detector of the landing detection unit 9.

The winding machine 5 is a winch that can wind and unwind (feed) the linear member 3. When the unmanned flight equipment 1 flies at a high speed, the winding machine 5 maintains the linear member 3 wound therearound and in contact with the body 15, thereby contributing to enhancement of stability. The winding machine 5 unwinds the linear member 3 to cause the delivery target T to descend to the ground while the aerial vehicle 2 is hovering in midair.

The winding machine 5 can be configured to have a torque sensor 27 that detects a torque of the winding machine 5. The torque sensor 27 can constitute a detector of the tension detection unit 8.

As described earlier, the contact detection unit 6 may be configured to have the linear member contact detection unit 10 that detects contact with at least the lower region of the linear member 3, and the container contact detection unit 11 that detects contact with the container 4.

The linear member contact detection unit 10 can be configured to have the linear member contact detection sensor 24 and the linear member contact determinator 19 that determines whether or not a person or an object has come into contact with the container 4, based on a detection signal from the linear member contact detection sensor 24.

Figure 3:
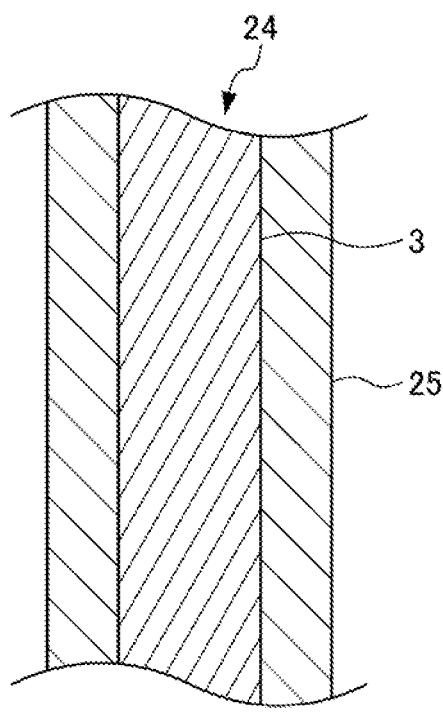
FIG. 3 is a schematic cross-sectional view showing a configuration of a linear member contact detection sensor included in the unmanned flight equipment of FIG. 1.

Examples of the linear member contact detection sensor 24 include a pressure sensor that detects a pressure and a capacitance sensor that detects a change in capacitance. For example, the linear member contact detection sensor 24 may be embodied as a capacitance sensor that has the linear member 3 with electrical conductivity and a protection cover 28 constituted by a dielectric substance and provided on the outer periphery of the linear member 3, as shown in FIG. 3. The linear member contact detection sensor 24 can be configured to detect a feeble current passing through a capacitor for which the linear member 3 serves as an electrode and the body of a person serves as the other electrode. A current detection circuit may be provided in the body 15 of the aerial vehicle 2 or in the container 4.

The linear member contact determinator 19 can be configured to determine that an object or the like has come into contact with the linear member 3 when a value (e.g. a current value) detected by the linear member contact detection sensor 24 exceeds a preset detection threshold. Alternatively, in order not to detect temporary contact of a small piece of trash or the like blown by a wind, the linear member contact determinator 19 may determine that an object or the like has come into contact with the linear member 3 when a value detected by the linear member contact detection sensor 24 continues being greater than a preset detection threshold for a period equal to or longer than a preset time threshold.

The container contact detection unit 11 can be configured to have the container contact detection sensor 25 and the container contact determinator 20 that determines whether or not a person or an object has come into contact with the container 4, based on a detection signal from the container contact detection sensor 25.

Examples of the container contact detection sensor 25 include a pressure sensor that detects a pressure and a capacitance sensor that detects a change in capacitance. Specifically, the container contact detection sensor 25 may be embodied as a capacitance sensor that has an electrode layered on the outer surface of the container 4 and a dielectric substrate layer provided over the outer surface of the electrode. It is preferable that the container contact detection sensor 25 is provided on the top surface or the side surface of the container 4 or that the container contact detection sensor 25 covers the substantial entirety of the top and side surfaces of the container 4.

Like the linear member contact determinator 19, the container contact determinator 20 can be configured to determine that an object or the like has come into contact with the container 4 when a value (e.g. a current value) detected by the container contact detection sensor 25 exceeds a preset detection threshold. Alternatively, in order not to detect temporary contact of a small piece of trash or the like blown by a wind, the container contact determinator 20 may determine that an object or the like has come into contact with the container 4 when a value detected by the container contact detection sensor 25 continues being greater than a preset detection threshold for a period equal to or longer than a preset time threshold.

As described earlier, the separation unit 7 can be configured to have: the linear member separation mechanism 12 that cuts off the linear member 3 at a point near the aerial vehicle 2 such that at least the lower region of the linear member 3 is separated; and the container separation mechanism 13 that cuts off the container 4 from the linear member 3.

The linear member separation mechanism 12 cuts off at least the lower region of the linear member 3 so that the lower region and the container 4 (delivery target T) are separated from the aerial vehicle 2. Specifically, the linear member separation mechanism 12 can be configured, for example, to have a cutter for cutting the linear member 3.

The container separation mechanism 13 cuts off the container 4 from the linear member 3 so that the container 4 is separated from the linear member 3, and consequently, the delivery target T is separated from the aerial vehicle 2. Specifically, examples of the configuration of the container separation mechanism 13 include: a combination of a suspension ring that is provided on the top of the container 4 and an openable/closeable hook that is provided at the lower end of the linear member 3 and that is engageable with the suspension ring; and a combination of an insertion part that fits into an opening formed in the top of the container 4 and an extendable/retractable retainer nail that is provided at an end of the insertion part. Alternatively, the container separation mechanism 13 may be configured to have a movable structure that is provided at the container 4 and that can engage with and disengage from the end of the linear member 3.

The selector 23 selectively actuates the linear member separation mechanism 12 or the container separation mechanism 13 based on the detection results of the linear member contact detection unit 10 and the container contact detection unit 11 of the contact detection unit 6, while taking account of the detection results of the tension detection unit 8 and the landing detection unit. Specifically, during the flight of the unmanned flight equipment 1, the selector 23 actuates the linear member separation mechanism 12 if the linear member contact detection unit 10 detects contact with the linear member 3 or if the tension detection unit 8 detects a tension on the linear member 3, and actuates the container separation mechanism 13 if the container contact detection unit 11 detects contact with the container 4 while the linear member contact detection unit 10 and the tension detection unit 8 do not detect the respective detection targets. If the landing detection unit 9 detects landing, the selector 23 actuates the container separation mechanism 13, as a normal operation for delivering the delivery target T.

The tension detection unit 8 can be configured to have the torque sensor 27, and the tension determinator 21 that determines whether or not the linear member 3 has been pulled directly or via the container 4, based on a detection signal from the torque sensor 27.

The torque sensor 27 may be constituted by a strain sensor or the like that detects torsion of a shaft of the winding machine 5.

The tension determinator 21 can be configured to determine that the linear member 3 has been pulled when a value detected by the torque sensor 27 exceeds a preset threshold.

The landing detection unit 9 can be configured to have the landing detection sensor 26 and the landing determinator 22 that determines whether the container 4 is in contact with the ground, based on a detection signal from the landing detection sensor 26.

The landing detection sensor 26 may be constituted by, for example, a pressure sensor, a switch operable by the weight of the delivery target T.

When the container contact detection unit 11 detects contact, the selector 23 actuates the container separation mechanism 13 to separate the container 4 (delivery target T) from the linear member 3. When the linear member contact detection unit 10 detects contact, the selector 23 actuates the linear member separation mechanism 12 to separate at least the lower region of the linear member 3 and the delivery target T from the aerial vehicle 2. In other words, when a person or an animal actively interferes with the linear member 3 and/or the container 4, or when the linear member 3 and/or the container 4 are/is caught by a tree, a building, etc., the selector 23 separates the part contacting with the contact object (including a person and an animal) before the contact object applies a strong force to the aerial vehicle 2 via the linear member 3, thereby preventing destabilization of the flight condition of the aerial vehicle 2.

When the tension detection unit 8 detects a tension on the linear member 3, the selector 23 may actuates the linear member separation mechanism 12 to separate at least the lower region of the linear member 3 and the delivery target T from the aerial vehicle 2. As described earlier, when the linear member contact detection unit 10 detects contact with the linear member 3, the selector 23 actuates the linear member separation mechanism 12 to separate the linear member 3. Here, if the linear member 3 is separated before a tension acts on the linear member 3, the tension detection unit 8 will no longer detect a tension on the linear member 3. However, there is a time delay (time lag) between detection of contact and separation of the linear member 3 since it takes time to perform associated processing and to drive the linear member separation mechanism 12. Therefore, depending on the speed at which the contact object causes a tension to act on the linear member 3 (e.g., if the speed is very high), the tension detection unit 8 may detect the tension on the linear member 3 before the separation of the linear member 3 takes place. In addition, if the linear member contact detection unit 10 cannot detect contact with the linear member 3 due to the type and condition of a contact object, the type of the sensor, etc., or due to a failure of the linear member contact detection unit 10, it is possible that the tension detection unit 8 detects a tension on the linear member 3 prior to the linear member contact detection unit 10. In these cases, it is conceivable to perform the separation of the linear member 3 as emergency control.

In addition, when the landing detection unit detects landing of the container 4, the selector 23 separates the container 4 from the linear member 3 in order to deliver the delivery target T to a receiver.

Figure 4:
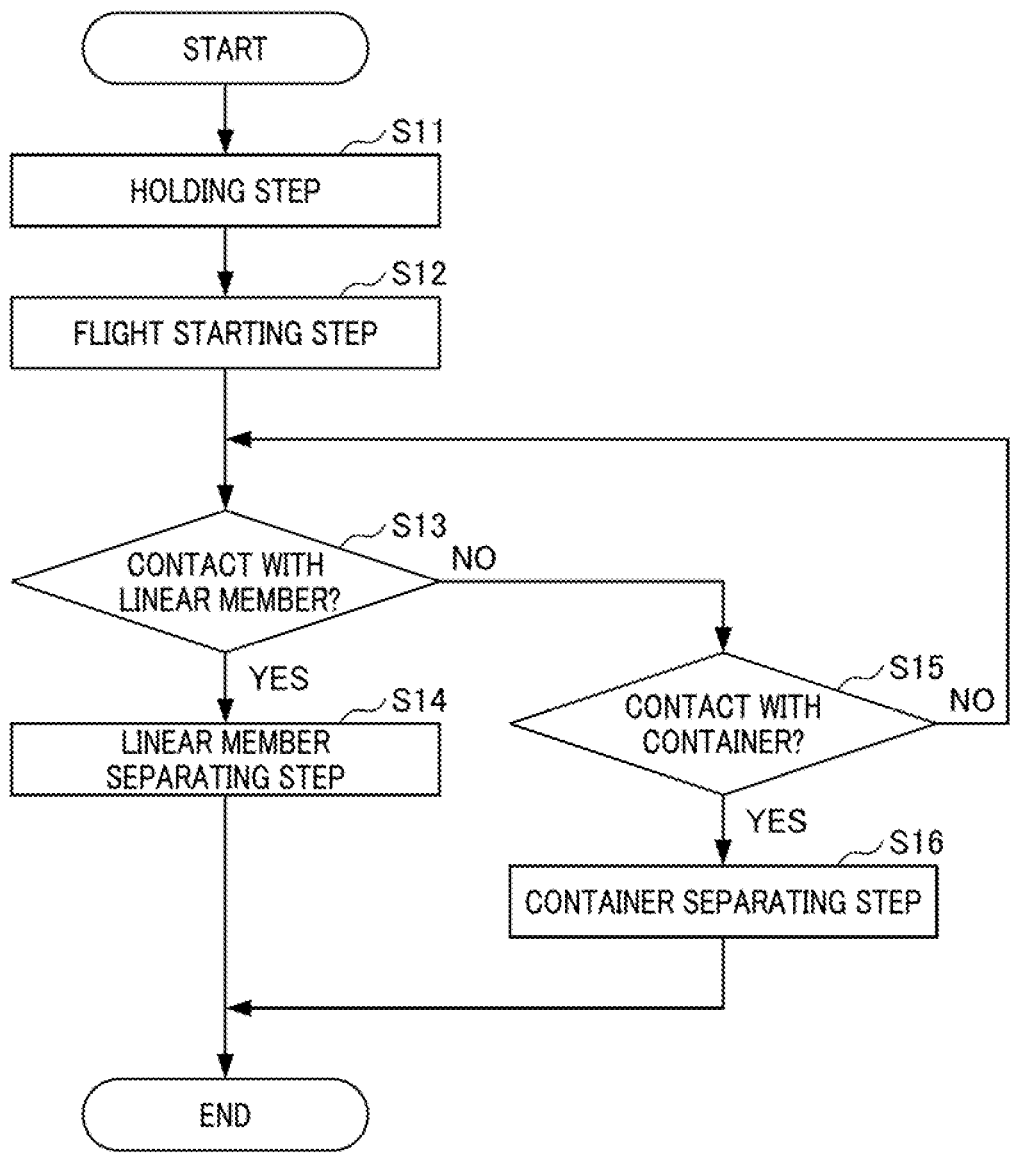
FIG. 4 is a flowchart showing a process of control of delivery performed by the unmanned flight equipment of FIG. 1.

FIG. 4 shows a process of a method for delivering the delivery target T by the unmanned flight equipment 1. This method for delivering the delivery target T by the unmanned flight equipment 1 is a method for delivering the delivery target T by the aerial vehicle 2 capable of flying in an unmanned manner, and is per se an embodiment of the delivery method according to the present invention.

The delivery method shown in FIG. 4 includes: causing the linear member 3 that is to be suspended from the aerial vehicle 2 to hold the delivery target T at the lower end of the linear member 3 (step S11: delivery target holding step); starting flight of the aerial vehicle 2 (step S12: flight starting step); detecting contact with the linear member 3 by the linear member contact detection unit 10 (step S13: linear member contact detecting step); separating the linear member 3 by the linear member separation mechanism 12 (step S14: linear member separating step); detecting contact with the container 4 (delivery target T) by the container contact detection unit 11 (step S15: container contact detecting step); and separating the container 4 (delivery target T) by the container separation mechanism 13 (step S16: container separating step).

In the step S11, i.e., the delivery target holding step, the container 4 is connected to the lower end of the linear member 3, whereby the delivery target T (with or without the cargo W) is held by the aerial vehicle 2.

In the step S12, i.e., the flight starting step, the flight of the unmanned flight equipment 1 is started. Therefore, the step S13 and the subsequent steps are performed during the flight of the aerial vehicle 2. Since the flight of the unmanned flight equipment 1 can be controlled by a well-known method, detailed description thereof will be omitted.

In the step S13, i.e., the linear member contact detecting step, the linear member contact detection unit 10 checks whether or not an object or the like has come into contact with the linear member 3. If contact with the linear member 3 is confirmed in the linear member contact detecting step, the process proceeds to the step S14, i.e., the linear member separating step. If contact with the linear member 3 is not confirmed, the process proceeds to the step S15, i.e., the container contact detecting step.

In the step S14, which is the linear member separating step, the linear member separation mechanism 12 cuts off the linear member 3 so that the lower region of the linear member 3 is separated from the aerial vehicle 2.

In the step S15, i.e., the container contact detecting step, the container contact detection unit 11 checks whether or not an object or the like has come into contact with the container 4. If contact with the container 4 is confirmed in the container contact detecting step, the process proceeds to the step S16, i.e., the container separating step. If contact with the container 4 is not confirmed, the process returns to the step S13, which is the linear member contact detecting step.

In the step S16, i.e., the container separating step, the container separation mechanism 13 separates the container 4 (delivery target T) from the linear member 3.

When the linear member separating step as the step S14 or the container separating step as the step S16 is performed, the delivery of the delivery target T is ended. The unmanned flight equipment 1 continues flying in accordance with a preset program even after the completion of delivery of the delivery target T.

When it is determined that an object or the like has come into contact with the linear member 3 or the container 4, the unmanned flight equipment 1 described above separates the linear member 3 or the delivery target T so as to prevent the aerial vehicle 2 from receiving a strong external force that can be applied due to a tension acting on the linear member 3. Therefore, the unmanned flight equipment 1 is less likely to allow the attitude of the aerial vehicle 2 to be destabilized. In particular, when the delivery of the cargo W takes place in a place where many people are present, a third party may pull the linear member 3 or container 4 for the sake of interest. In such a case, separating the linear member 3 or the container 4 at the moment when the person touches the linear member 3 or the container 4 makes it possible to prevent the aerial vehicle 2 from being pulled and brought into an unstable attitude.

Figure 5:
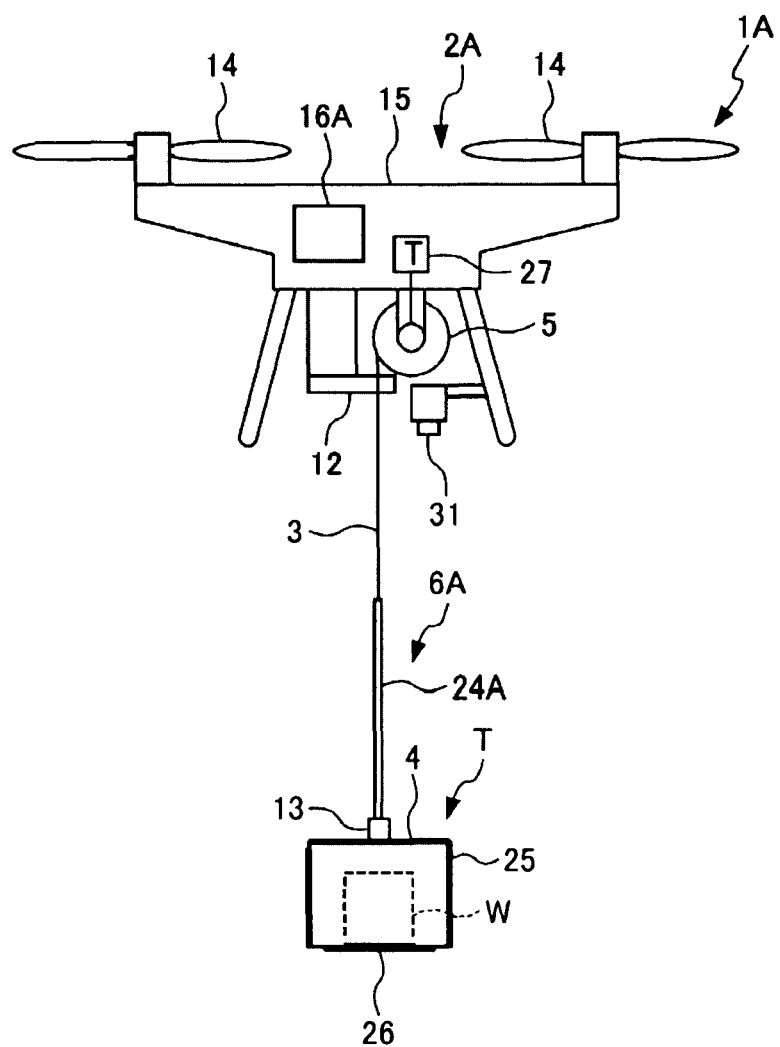
FIG. 5 is schematic side view showing a configuration of unmanned flight equipment according to a second embodiment of the present invention.
Figure 6:
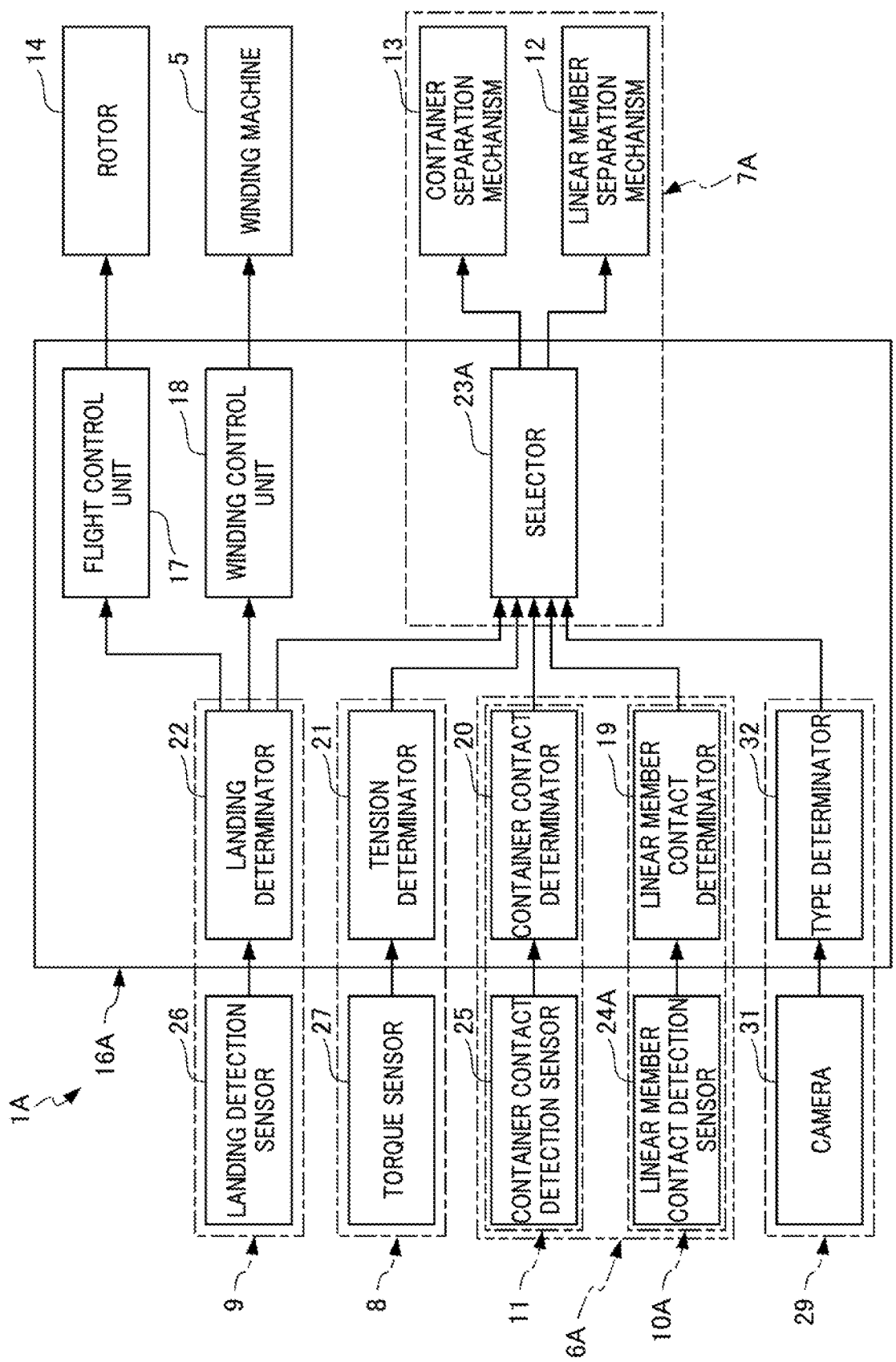
FIG. 6 is a block diagram showing the configuration of the unmanned flight equipment of FIG. 5.

Next, unmanned flight equipment 1A according to a second embodiment of the present invention will be described. FIG. 5 is a schematic side view showing a configuration of the unmanned flight equipment 1A according to the second embodiment of the present invention. FIG. 6 is a block diagram showing the configuration of the unmanned flight equipment 1A of FIG. 5.

The unmanned flight equipment 1A includes: an aerial vehicle 2A capable of flying in an unmanned manner; a linear member 3 configured to be suspended from the aerial vehicle 2A; a container 4 held at a lower end of the linear member 3 and configured to accommodate therein a cargo W (the cargo W and the container 4 may be collectively referred to as the "delivery target T"); a winding machine 5 capable of winding the linear member 3; a contact detection unit 6A configured to detect contact of an object (including a person and an animal) with the linear member 3 or the container 4; a separation unit 7A configured to separate the linear member 3 or the container 4 from the aerial vehicle 2A; a tension detection unit 8 configured to detect a pull on the linear member 3 or the container 4; a landing detection unit 9 configured to detect landing of the container 4; and a contact object discrimination unit 29 configured to discriminate the type of a contact object contacting with the linear member 3 or the container 4. Note that in the following description of the unmanned flight equipment 1A of the second embodiment, the same components as those of the unmanned flight equipment 1 of the first embodiment will be denoted by the same reference characters, and the description thereof will not be repeated.

The aerial vehicle 2A has a control device 16A that controls flight and constitutes control elements of the contact detection unit 6A, the separation unit 7A, the tension detection unit 8, the landing detection unit 9 and the contact object discrimination unit 29.

The contact detection unit 6A can be configured to have: a linear member contact detection unit 10A that detects contact with at least a lower region of the linear member 3; and a container contact detection unit 11 that detects contact with the container 4. The linear member contact detection unit 10A can be configured to have a linear member contact detection sensor 24A and a linear member contact determinator 19.

Figure 7:
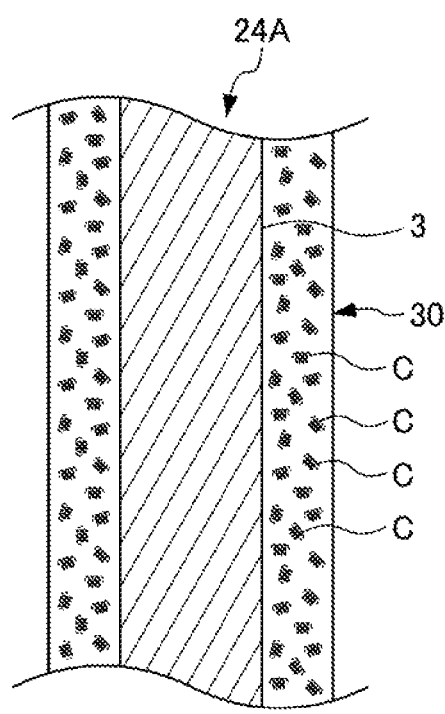
FIG. 7 is a schematic cross-sectional view showing a configuration of a linear member contact detection sensor included in the unmanned flight equipment of FIG. 5.

As shown in FIG. 7, the linear member contact detection sensor 24A may be configured to have a sensitive layer 30 that is provided on the outer periphery of the linear member 3 and is made of an insulating elastomeric matrix containing a large number of carbon microcoils dispersed therein. Due to the large number of carbon microcoils contained therein, the sensitive layer 30 can be electrically considered to be a distributed constant circuit in which a plurality of resistors, capacitors and inductors are complexly combined. When an external force is applied to a portion of the sensitive layer 30, since the carbon microcoils present in the portion are deformed and moved, the electrical characteristics of the sensitive layer 30 change in a highly sensitive manner. For this reason, the linear member contact detection unit 10A detects a change in the electric characteristics of the sensitive layer 30 caused by a feeble contact pressure that is applied by contact of an object with the linear member contact detection sensor 24A, thereby detecting the contact of the object with the linear member 3. A detection circuit may be provided in the body 15 of the aerial vehicle 2A or in the container 4.

The separation unit 7A can be configured to have: a linear member separation mechanism 12 that cuts off the linear member 3 at a point near the aerial vehicle 2A such that at least a lower region of the linear member 3 is separated; a container separation mechanism 13 that cuts off the container 4 from the linear member 3; and a selector 23A.

The selector 23A selectively actuates one of the linear member separation mechanism 12 and the container separation mechanism 13 based on the determination results of the linear member contact detection unit 10A, the container contact detection unit 11, the tension detection unit 8, the landing detection unit 9 and the contact object discrimination unit 29. Even in the case where the linear member contact detection unit 10A or the container contact detection unit 11 detects contact, if the contact object discriminated by the contact object discrimination unit 29 is considered to be an object that does not destabilize the flight of the aerial vehicle 2, such as a small object (including a small animal), the selector 23A may keep the linear member separation mechanism 12 and the container separation mechanism 13 inactive. Thus, the selector 23A may actuate the separation unit 7A with reference to a correspondence table describing operations of the separation unit 7A, that is, correspondences between the determination results of the contact object discrimination unit 29, whether to actuate the linear member separation mechanism 12 or the container separation mechanism 13, and whether to keep both mechanisms 12 and 13 inactive.

The contact object discrimination unit 29 can be configured to have: a camera 31 that is held on the aerial vehicle 2A and captures an image of a view below the camera 31; and a type determinator 32 that determines the type of a contact object contacting with the linear member 3 or the container 4 based on the image captured by the camera 31. For example, the contact object discrimination unit 29 can be configured to discriminate the type of a contact object based on the size and shape of the contact object in the captured image.

As can be seen, the unmanned flight equipment 1A, which is provided with the contact object discrimination unit 29, can separate the delivery target T more appropriately, and thereby can prevent destabilization of the flight of the aerial vehicle 2A.

As described above, each of the embodiments of the present invention achieves advantageous effects due to the following configurations.

The unmanned flight equipment (1, 1A) includes: the aerial vehicle (2, 2A) capable of flying in an unmanned manner; the linear member (3) configured to be suspended from the aerial vehicle (2, 2A) and to hold the delivery target (T: the container 4 and the cargo W) at the lower end thereof; the contact detection unit (6, 6A) configured to detect contact with the delivery target (T: the container 4) or contact with the linear member (3); and the separation unit (7, 7A) configured to separate the delivery target (T) or the linear member (3) based on the detection result of the contact detection unit (6, 6A). With this configuration, the delivery target (T) or the linear member (3) is separated from the aerial vehicle (2, 2A) before a contact object applies a strong external force to the aerial vehicle (2, 2A) via the linear member (3), whereby the flight condition of the aerial vehicle (2, 2A) is prevented from being destabilized.

In the unmanned flight equipment (1A), the separation unit (7A) has the selector (23A) that selects whether to separate only the delivery target (T) or to separate the linear member (3) together with the delivery target (T). With this feature, the unmanned flight equipment (1A) can separate the delivery target (T) more appropriately, and can prevent destabilization of the flight of the aerial vehicle (2A) more reliably.

The unmanned flight equipment (1A) further includes the contact object discrimination unit (29) configured to discriminate a type of a contact object whose contact has been detected by the contact detection unit (6A), and the separation unit (7A) selects whether to separate only the delivery target (T) or to separate the linear member (3) together with the delivery target (T), in accordance with the type of the contact object. This feature enables the unmanned flight equipment (1A) to separate the delivery target (T) only when the separation is intended, thereby preventing destabilization of the flight of the aerial vehicle (2A).

In the unmanned flight equipment (1, 1A), the contact detection unit (6) detects contact with the delivery target (T) and contact with the linear member (3) while distinguishing the contact with the delivery target (T) and the contact with the linear member (3) from each other. The separation unit (7A) selects whether to separate only the delivery target (T) or to separate the linear member (3) together with the delivery target (T), in accordance with the type of contact object. This feature enables the unmanned flight equipment (1, 1A) to separate the delivery target (T) only when the separation is intended, whereby the flight of the aerial vehicle (2A) can be prevented from being destabilized.

In the unmanned flight equipment (1, 1A), the contact detection unit (6, 6A) detects contact with the top surface or side surface of the delivery target (T). This feature makes it possible to detect contact involving high probability that an external force will act on the delivery target (T) and the aerial vehicle (2, 2A) will be pulled.

The unmanned flight equipment (1, 1A) further includes the tension detection unit (8) that detects a pull on the delivery target (T) or the linear member (3), and the separation unit (7, 7A) separates the delivery target (T) or the linear member (3) while taking account of a detection result of the tension detection unit (8). Specifically, the separation unit (7, 7A) has: the container separation mechanism (13) that separates the delivery target (T); the linear member separation mechanism (12) that separates the linear member (3); and the selector (23) that actuate either the container separation mechanism (13) or the linear member separation mechanism (12) based on the detection result of the contact detection unit (6, 6A) and the detection result of the tension detection unit (8). As a result, even in the event that the contact detection unit (6, 6A) cannot detect contact properly, the delivery target (T) or the linear member (3) is separated, whereby the aerial vehicle (2, 2A) is prevented from being pulled strongly.

The unmanned flight equipment (1, 1A) further includes the landing detection unit (9) configured to detect landing of the delivery target. The separation unit (7, 7A) separates the delivery target (T) or the linear member (3) while taking account of a detection result of the landing detection unit (9). This feature makes it possible to deliver the delivery target (T) without dropping the delivery target (T) in normal delivery.

In the unmanned flight equipment (1, 1A), the delivery target (T) includes the container (4) held at the lower end of the linear member (3) and configured to accommodate therein the cargo (W). This feature makes it easy for the contact detection unit (6) to detect contact with delivery target (T).

In the unmanned flight equipment (1, 1A), the contact detection unit (6, 6A) includes the contact detection sensor (24, 24A) that is configured to detect contact with at least the lower region of the linear member (3). This feature enables reliable detection of contact with the linear member (3).

In the unmanned flight equipment (1), the contact detection sensor (24) is a capacitance sensor that detects a change in capacitance. This feature makes it possible to detect contact with the linear member (3) relatively easily.

In the unmanned flight equipment (1A), the contact detection sensor (24A) includes carbon microcoils. This feature enables fine detection of contact with the linear member (3).

The method for delivering the delivery target (T) by the aerial vehicle (2) capable of flying in an unmanned manner includes: causing the linear member (3) that is to be suspended from the aerial vehicle (2) to hold the delivery target (T) at the lower end thereof; detecting contact with the delivery target (T) or contact with the linear member (3) during flight of the aerial vehicle (2); and separating the delivery target (T) or the linear member (3) based on a detection result obtained in the detecting contact. As a result, when an object comes into contact with the delivery target (T) or the linear member (3), the delivery target (T) or the linear member (3) is separated from the aerial vehicle (2) before the contact object applies a strong force to the aerial vehicle (2) via the linear member (3), thereby preventing the flight conditions of the aerial vehicle (2) from being destabilized.

Two embodiments of the present invention have been described in the foregoing. However, the present invention is not limited to the above-described embodiments, but encompasses variations, improvements, and the like within the scope allowing achievement of the object of the present invention.

In unmanned flight equipment according to an embodiment of the present invention, the aerial vehicle is not limited to an unmanned rotorcraft, but may be, for example, an airship or the like. In unmanned flight equipment according to an embodiment of the present invention, the delivery target may be any article, examples of which include arbitrary instruments such as a camera and a sensor. The delivery target does not have to include the container, and may be directly held at the lower end of the linear member using, for example, a binding band. The unmanned flight equipment of the present invention may exclude the winding machine, and the upper end of the linear member may be connected to the aerial vehicle.

In unmanned flight equipment according to an embodiment of the present invention, it is suitable that the contact detection unit detects contact with at least one of the linear member or the container, while having configuration with only one of the linear member contact detection unit and the container contact detection unit, for example. The contact detection unit may be configured to have an image-based contact detector that detects the presence or absence of contact with the linear member or the delivery target from an image captured by a camera. Such an image-based contact detector may be used alone or in combination with a detection unit, such as the linear member contact detection unit and the container contact detection unit, which uses a contact detection sensor.

In unmanned flight equipment according to an embodiment of the present invention, the tension detection unit and the landing detection unit may be omitted. Further, in unmanned flight equipment according to an embodiment of the present invention, it is suitable that the separation unit has at least one of the container separation mechanism and the linear member separation mechanism. In this case, the separation unit preferably includes the linear member separation mechanism.

In unmanned flight equipment according to an embodiment of the present invention, the configuration of the linear member contact detection sensor is not limited to the configurations described in the above embodiments, and may be any configuration as long as it can detect contact of an object. For example, the electrode of the linear member contact detection sensor may be a conductive layer provided on the outer periphery of the linear member. Alternatively, the linear member contact detection sensor may have an electrode also on the outer peripheral side.

In unmanned flight equipment according to an embodiment of the present invention, the type determinator may be configured to determine the type of a contact object based on information provided from a sensor or the like other than a camera. For example, the type determinator may have a three-dimensional distance sensor or the like. The type determinator may be configured to be integral with the contact detection unit. For example, in the case where the contact detection unit has a contact detection sensor including carbon microcoils, previously storing a relationship between tendencies to change of the electrical characteristics of the sensitive layer and the types of contact objects enables detection of contact and determination of the type of a contact object.

In the unmanned flight equipment according to each of the above-described embodiments, the constituent elements relating to the control of the contact detection unit, the separation unit, the tension detection unit and the landing detection unit are implemented by the control device housed in the body. However, at least part of these constituent elements relating to the control may be configured to be independent, or may be attached to or incorporated in a physical constituent element such as a sensor or a separation mechanism.

EXPLANATION OF REFERENCE NUMERALS 1, 1A: Unmanned Flight Equipment
2, 2A: Aerial Vehicle
3: Linear Member
4: Container
5: Winding Machine
6, 6A: Contact Detection Unit
7, 7A: Separation Unit
8: Tension Detection Unit
9: Landing Detection Unit
10, 10A: Linear Member Contact Detection Unit
11: Container Contact Detection Unit
12: Linear Member Separation Mechanism
13: Container Separation Mechanism
14: Rotor
15: Body
16, 16A: Control Device
17: Flight Control Unit
18: Winding Control Unit
19: Linear Member Contact Determinator
20: Container Contact Determinator
21: Tension Determinator
22: Landing Determinator
23, 23A: Selector
24, 24A: Linear Member Contact Detection Sensor
25: Container Contact Detection Sensor
26: Landing Detection Sensor
27: Torque Sensor
28: Protection Cover
29: Contact Object Discrimination Unit
30: Sensitive Layer
31: Camera
32: Type Determinator
C: Carbon Microcoil
T: Delivery Target
W: Cargo

The invention claimed is:

1. Unmanned flight equipment comprising:
   an aerial vehicle capable of flying in an unmanned manner;
   a linear member configured to be suspended from the aerial vehicle and to hold a delivery target at a lower end thereof;
   a contact detection unit including:
     a linear member contact detection unit configured to detect contact of an external object with the linear member during flight of the aerial vehicle, and
     a container contact detection unit configured to detect contact of the external object with the delivery target during flight of the aerial vehicle; and
   a separation unit configured to separate the delivery target from the linear member or separate the delivery target and the linear member from the aerial vehicle based on a detection result of the contact detection unit,
   wherein the contact detection unit is configured to distinguish between contact with the linear member detected by the linear member contact detection unit and contact with the delivery target detected by the container contact detection unit,
   wherein the separation unit is configured to separate the delivery target from the linear member when the container contact detection unit detects contact, and
   wherein the separation unit is configured to separate the delivery target and the linear member from the aerial vehicle when the linear member contact detection unit detects contact.

2. The unmanned flight equipment according to claim 1, wherein
   the separation unit includes a selector configured to select a mode of separation between separation only of the delivery target and separation of the linear member together with the delivery target.

3. The unmanned flight equipment according to claim 2, further comprising:
   a contact target discrimination unit configured to discriminate a type of the external object whose contact has been detected by the contact detection unit, wherein
   the selector selects the mode of separation in accordance with the type of the external object.

4. The unmanned flight equipment according to claim 1, wherein
   the container contact detection unit detects contact with at least one of a top surface and a side surface of the delivery target.

5. The unmanned flight equipment according to claim 1, further comprising:
   a tension detection unit configured to detect a pull on at least one of the delivery target and the linear member, wherein
   the separation unit separates the delivery target or the linear member based at least in part on a detection result of the tension detection unit.

6. The unmanned flight equipment according to claim 1, further comprising:
   a landing detection unit configured to detect landing of the delivery target, wherein
   the separation unit separates the delivery target or the linear member based at least in part on a detection result of the landing detection unit.

7. The unmanned flight equipment according to claim 1, wherein
the delivery target includes a container held at the lower end of the linear member and configured to accommodate therein a cargo.

8. The unmanned flight equipment according to claim 1, wherein
the linear member contact detection unit includes a linear member contact detection sensor configured to detect contact with at least a lower region of the linear member.

9. The unmanned flight equipment according to claim 8, wherein
the linear member contact detection sensor is a capacitance sensor configured to detect a change in capacitance.

10. The unmanned flight equipment according to claim 8, wherein
the linear member contact detection sensor includes a carbon microcoil.

11. The unmanned flight equipment according to claim 8, wherein
the linear member contact detection sensor is disposed over an outer periphery of the lower region of the linear member.

12. The unmanned flight equipment according to claim 8, wherein
the linear member contact detection sensor is configured to dismiss contact below a preset detection threshold; and
the linear member contact detection sensor is configured to dismiss contact for a period below a preset time threshold.

13. A method for delivering a delivery target by an aerial vehicle capable of flying in an unmanned manner, the method comprising:
causing a linear member that is to be suspended from the aerial vehicle to hold the delivery target at a lower end of the linear member;
detecting contact of an external object with the delivery target or contact with the linear member during flight of the aerial vehicle;
distinguishing between contact with the linear member and contact with the delivery target; and
separating the delivery target or the linear member from the aerial vehicle based on a detection result,
wherein the delivery target is separated from the linear member when contact with the delivery target is detected, and
wherein the delivery target and the linear member are separated from the aerial vehicle when contact with the linear member is detected.

* * * * *